(12) United States Patent
Park et al.

(10) Patent No.: US 9,126,479 B2
(45) Date of Patent: Sep. 8, 2015

(54) HYBRID POWER TRAIN FOR VEHICLE

(71) Applicant: Hyundai Motor Company, Seoul (KR)

(72) Inventors: Jong Yun Park, Hwaseong-si (KR); Jae Young Choi, Busan (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/313,944

(22) Filed: Jun. 24, 2014

(65) Prior Publication Data

US 2015/0148188 A1    May 28, 2015

(30) Foreign Application Priority Data

Nov. 25, 2013 (KR) .................. 10-2013-0143607

(51) Int. Cl.

| F16H 3/72 | (2006.01) |
|---|---|
| B60K 6/54 | (2007.10) |
| B60K 6/42 | (2007.10) |
| B60W 20/00 | (2006.01) |
| F16H 1/28 | (2006.01) |
| B60K 6/445 | (2007.10) |
| F16H 37/04 | (2006.01) |
| B60K 6/365 | (2007.10) |

(52) U.S. Cl.
CPC ... *B60K 6/54* (2013.01); *B60K 6/42* (2013.01); *B60K 6/445* (2013.01); *B60W 20/30* (2013.01); *F16H 1/28* (2013.01); *F16H 3/72* (2013.01); *B60K 6/365* (2013.01); *F16H 37/042* (2013.01); *Y10S 903/902* (2013.01); *Y10T 477/23* (2015.01)

(58) Field of Classification Search
None
See application file for complete search history.

(56) References Cited

U.S. PATENT DOCUMENTS

| 8,771,139 | B2 * | 7/2014 | Ideshio et al. .................... 477/8 |
| 8,771,143 | B2 * | 7/2014 | Tanba et al. ...................... 477/84 |
| 2003/0045389 | A1 * | 3/2003 | Kima ................................. 475/5 |
| 2010/0009805 | A1 | 1/2010 | Bachmann |
| 2012/0303201 | A1 * | 11/2012 | Tsuneishi et al. ............... 701/22 |
| 2013/0331227 | A1 * | 12/2013 | Kato ................................. 477/3 |
| 2015/0006000 | A1 * | 1/2015 | Kawata et al. .................. 701/22 |

FOREIGN PATENT DOCUMENTS

| KR | 10-0863636 B1 | 10/2008 |
| KR | 10-2009-0132758 A | 12/2009 |
| KR | 10-2012-0019855 A | 3/2012 |

* cited by examiner

*Primary Examiner* — Justin Holmes
(74) *Attorney, Agent, or Firm* — Morgan, Lewis & Bockius LLP

(57) ABSTRACT

A hybrid power train for a vehicle may include a shift module with a plurality of shift steps of a synchro-mesh type provided on a first input shaft and an output shaft, a second input shaft driven by a motor and arranged coaxially with the first input shaft, a shaft clutch means for coupling/decoupling the second input shaft and the first input shaft, a motor side driving gear arranged rotatably on the second input shaft, a motor side driven gear arranged rotatably on the output shaft to be meshed with the motor side driving gear, a first clutch means for coupling/decoupling the motor side driving gear to/from the second input shaft, a second clutch means provided for coupling/decoupling the motor side driven gear to/from the output shaft, and a variable gear ratio providing means provided on the second input shaft to alternatively transfer a rotational force of the second input shaft to the output shaft.

9 Claims, 9 Drawing Sheets

HYBRID POWER TRAIN FOR VEHICLE

CROSS-REFERENCE TO RELATED APPLICATION

The present application claims priority of Korean Patent Application Number 10-2013-0143607 filed on Nov. 25, 2013, the entire contents of which application are incorporated herein for all purposes by this reference.

BACKGROUND OF INVENTION

1. Field of Invention

The present invention relates to a hybrid power train for a vehicle, and more particularly, to a configuration of the hybrid power train for a vehicle based on a manual transmission mechanism of a synchro-mesh type.

2. Description of Related Art

Generally, the power generated from an internal combustion engine and the power generated from a motor that is driven electrically are combined to drive a vehicle through the hybrid power train wherein a power efficiency for driving a vehicle is improved using the complementary aspects of the torque property of an engine and the torque property of a motor.

As such, according to a conventional hybrid power train, an EV mode is implemented at a low speed or at starting-on thereof where a vehicle is driven by a motor by utilizing the excellent torque characteristics of the motor, an engine mode is implemented at a middle speed or a high speed where a vehicle is driven by an engine by utilizing the relatively excellent torques characteristics of the engine and a hybrid mode is implemented at a situation in which high torque is required when a vehicle is driven by a motor and an engine by utilizing the torque thereof.

A conventional hybrid power train based on a manual transmission is configured as an automated manual transmission (AMT) such that ATM and a motor are to be controlled and the power from a motor serves as a driving torque at a low speed of a vehicle by using mainly reduction gears and the power from an engine serves as a driving torque at a high speed of a vehicle by using mainly multiplying gears, considering a space occupied by a transmission of a vehicle and an ultimate fuel ratio. However, it is difficult to ensure a good shift feeling at a section where the step ratio is great and the shift feeling is deteriorated generally due to a torque interruption feeling that is generated intrinsically by the AMT when shifting gears.

Further, according to a conventional hybrid power train, a rotor of a motor is rotated by the power from an engine while a vehicle is driven by the engine and thus the rotation of the motor while a vehicle is driven by only the engine serves as a drag torque, thereby causing deterioration of a fuel ratio for a vehicle.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to solve the problems of the related art and/or other problems, and to provide a hybrid power train based on a manual transmission mechanism in which the degree of freedom for implementing the step ratios to be further narrowed in a range of the whole gear step to be implemented can be ensured while configuring a compact power train, excellent shift quality can be provided by preventing the torque interruption feeling during the shifting, and the rotations of a motor and the components related to transfer the power of the motor can be prevented on an engine mode where a vehicle is driven by only the engine thereby to improve a fuel ratio of a vehicle.

A hybrid power train for a vehicle according to the present invention may include: a shift module provided with a plurality of shift steps of a synchro-mesh type on a first input shaft and an output shaft that are arranged in parallel to each other; a second input shaft that is driven by a motor and arranged coaxially with the first input shaft; a shaft clutch means provided for coupling or decoupling the second input shaft and the first input shaft; a motor side driving gear that is arranged rotatably on the second input shaft; a motor side driven gear that is arranged rotatably on the output shaft to be meshed with the motor side driving gear; a first clutch means provided for coupling or decoupling the motor side driving gear to or from the second input shaft; a second clutch means provided for coupling or decoupling the motor side driven gear to or from the output shaft; and a variable gear ratio providing means provided on the second input shaft to alternatively transfer a rotational force of the second input shaft to the output shaft with two gear ratios different from the shift module through the motor side driving gear and the motor side driven gear.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrating the accompanying drawings which are given herein below by way of illustration only, and thus are not limitative of the present invention, and wherein.

Figure 1:
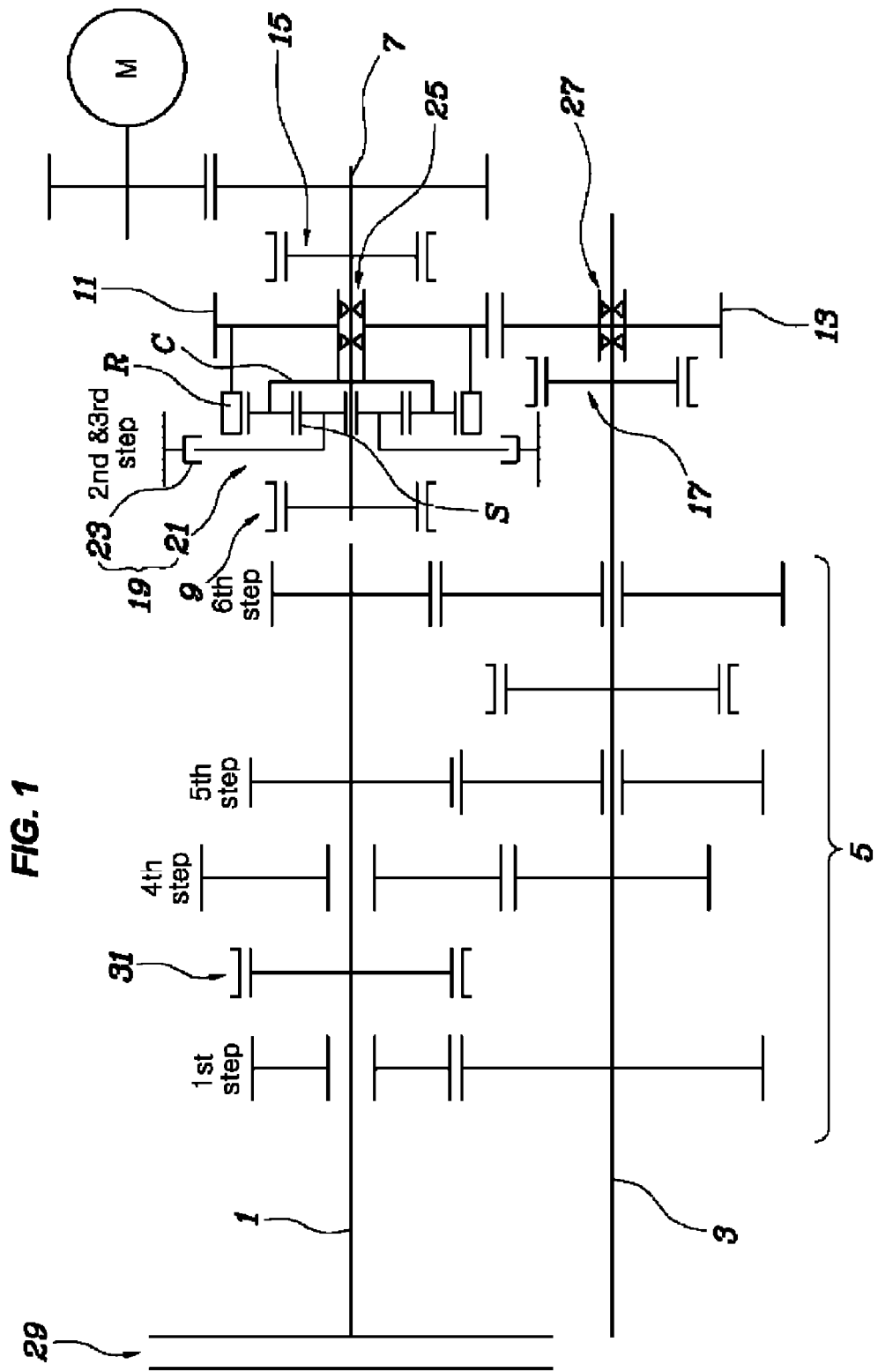
FIG. 1 is a view illustrating an exemplary hybrid power train for a vehicle according to the present invention.

It should be understood that the appended drawings are not necessarily to scale, presenting a somewhat simplified representation of various preferred features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1, a hybrid power train according to various embodiments of the present invention includes: a shift module 5 provided with a plurality of shift steps of a synchro-mesh type on a first input shaft 1 and an output shaft 3 that are arranged in parallel to each other; a second input shaft 7 that is driven by a motor M and arranged coaxially with the first input shaft 1; a shaft clutch means 9 provided for coupling or decoupling the second input shaft 7 and the first input shaft 1; a motor side driving gear 11 that is arranged rotatably on the second input shaft 7; a motor side driven gears 13 that is arranged rotatably on the output shaft 3 to be meshed with the motor side driving gear 11; a first clutch means 15 provided for switching the coupling/decoupling of the motor side driving gear 11 to/from the second input shaft 7; a second clutch means 17 provided for switching the coupling/decoupling of the motor side driven gear 13 to/from the output shaft 3; and a variable gear ratio providing means 19 provided on the second input shaft 7 to transfer the rotational force of the second input shaft 7 to the output shaft 3 with alternatively different gear ratios through the motor side driving gear 11 and the motor side driven gear 13.

The variable gear ratio providing means 19 implements a series of gear ratios having effective step ratios together with the shift steps implemented by the shift module 5. That is, a series of effective and proper gear ratios necessary for a vehicle can be implemented by the shift module 5 such as one including a conventional manual transmission mechanism of a general synchro-mesh type, the motor side driving gear 11 and the motor side driven gear 13 provided on the second input shaft 7 and the output shaft 3, respectively, and the variable gear ratio providing means 19.

For example, the shift module 5 is provided with the gear steps having gear ratios of at least forward 1st step and 4th step and the variable gear ratio providing means 19 implements the gear ratios of 2nd step and 3rd step. Accordingly, the power train is configured to implement a series of effective gear ratios having proper step ratios of 1st step to 4th step wherein the gear steps to 6th step may be implemented in the present various embodiments.

Here, the effective gear ratio having the proper step ratios means that the relation between two gear rations provided by the variable gear ratio providing means 19 and the gear ratios of the gear steps provided by the shift module 5 does not form a relatively great step ratio but form an effective and proper step ratio without forming a very small step ratio.

That is, comparing the shift module 5 to a conventional general manual transmission, 2nd step and 3rd step that has to be implemented through the shift module 5 are to be implemented by the variable gear ratio providing means 19. Therefore, according to the power train of the present invention, an excellent shift feeling can be ensured by implementing a series of gear ratios having effective and proper step ratios.

The shaft clutch means 9 includes a synchro-device of a synchro-mesh type where a hub is arranged on the second input shaft 7, and the sleeve of the synchro-device is to be slid linearly toward the first input shaft 1 to couple integrally the first input shaft 1 and the second input shaft 7 to be rotated and on the contrary the sleeve is to be slid toward the second input shaft 7 to decouple the first input shaft 1 and the second input shaft 7.

The variable gear ratio providing means 19 includes a planetary gear device 21 which is arranged coaxially on the second input shaft 7, and has a plurality of rotational elements such as three rotational elements where one rotational element is coupled directly to the second input shaft 7, another rotational element is coupled directly to the motor side driving gear 11 and the last rotational element is able to be restricted from its rotation, and a brake 23 arranged to control the restriction state of the last rotational element of the planetary gear device 21.

Here, a first one way clutch 25 is provided between the motor side driving gear 11 and the second input shaft 7 so as to transfer power in only one direction from the second input shaft 7 to the motor side driving gear 11, and a second one way clutch 27 is provided between the output shaft 3 and the motor side driven gear 13 so as to transfer power in only one direction from the motor side driven gear 13 to the output shaft 3.

In more detail, in some embodiments, the planetary gear device 21 is provided with three rotational elements of a sun gear S, a carrier C and a ring gear R wherein the carrier C is coupled directly to the second input shaft 7, the ring gear R is coupled directly to the motor side driving gear 11, and the sun gear S is arranged such that its rotation is restricted by the brake 23.

The first clutch means 15 and the second clutch means 17 are provided as a dog clutch and a synchro-device of a synchro-mesh type, respectively, for transferring the reverse-rotational force of the motor M to the output shaft 3 by coupling the motor side driving gear 11 to the second input shaft 7 and coupling the motor side driven gear 13 to the output shaft 3 when a vehicle reverse-drives.

Meanwhile, the first input shaft 1 of the shift module 5 is coupled to an engine through the engine clutch 29.

FIGS. 2A-2E are views showing the procedures of shifting to 2nd step from 1st step in the present various embodiments as configured above. At the state of FIG. 2A the power input from an engine through the engine clutch 29 is drawn out to the output shaft 3 through 1st step of the shift module 5 wherein the sleeve of 1& 4th steps synchro-device 31 is coupled to the shift gear of 1st step and the power from an engine that is input to the first input shaft 1 through the engine clutch 29 is transferred to the shift gear of 1st step through the 1 & 4th steps synchro-device 31 to be drawn out to the output shaft 3. At this time, the shaft clutch means 9 for coupling/decoupling between the first input shaft 1 and the second input shaft 7 is in a releasing state and the motor is in a stop state and thus the second input shaft 7 is not to be rotated.

At this time, even though the output shaft 3 rotates in a forward direction, the second clutch means 17 is in a releasing state and the rotational force of the output shaft 3 is not transferred to the motor side driven gear 13 by the second one way clutch 27 and thus the motor, the second input shaft 7, and the motor side driving gear 11 are not rotated. Accordingly, the power from an engine is not consumed for rotating the motor and the related components connected thereto but used wholly for driving a vehicle, thereby improving a fuel ratio of a vehicle.

Figure 2A:
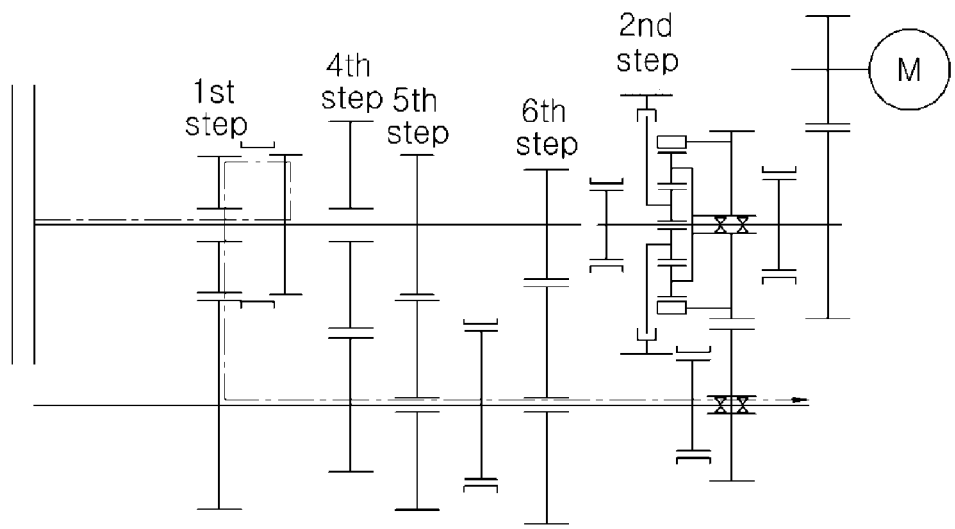
FIG. 2A is a view illustrating procedures of shifting to 2nd step from 1st step in the exemplary hybrid power train as shown in FIG. 1.
Figure 2B:
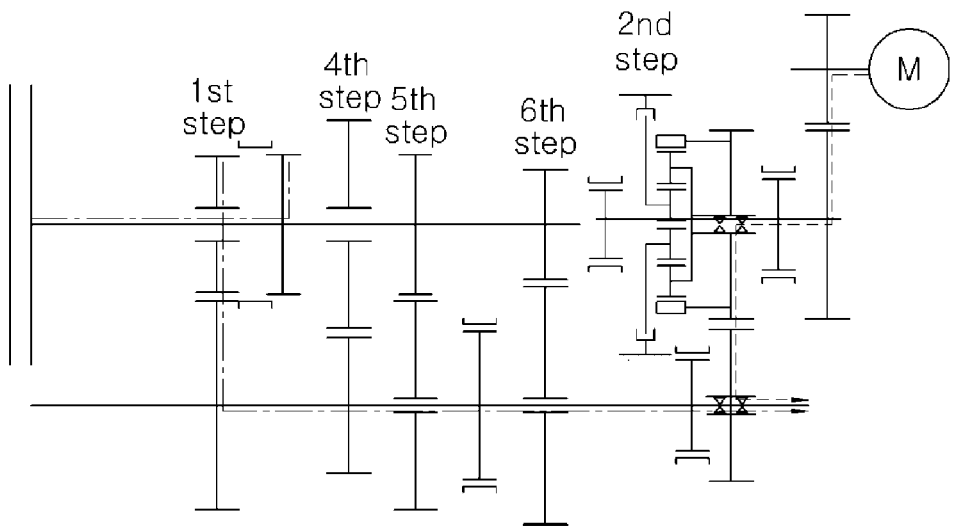
FIG. 2B is a view illustrating procedures of shifting to 2nd step from 1st step in the exemplary hybrid power train as shown in FIG. 1.

At the state of FIG. 2B the motor M is driven from the state as shown in FIG. 2A such that the rotational force of the second input shaft 7 is transferred to the output shaft 3 through the first one way clutch 25, the motor side driving gear 11, the motor side driven gear 13, and the second one way clutch 27. At this time, the sun gear S is rotated freely while the brake 23 is released and thus the carrier C is rotated regardless of the ring gear R and the speed of the motor M is controlled to correspond to the rotational speed of the output shaft 3 driven by the engine.

Subsequently, when the engine clutch 29 is released as in the state of FIG. 2C and then the 1& 4th steps synchro-device 31 of a synchro-mesh type is released, the output shaft 3 maintains a first speed state with the power from the motor not with the power from the engine.

That is, like a conventional general AMT, when the engine clutch 29 is released, the power transmission to the output shaft 3 is interrupted to cause a torque decrease. However, according to the present invention, the torque is provided continuously to the output shaft 3 from the motor even under this situation, thereby ensuring a smooth shift feeling.

Figure 2C:
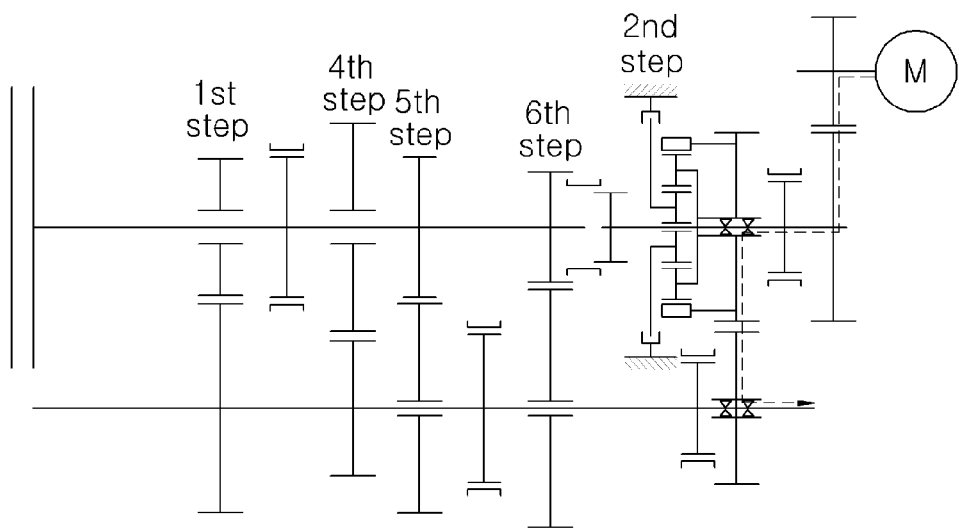
FIG. 2C is a view illustrating procedures of shifting to 2nd step from 1st step in the exemplary hybrid power train as shown in FIG. 1.

Further, at the state as shown in FIG. 2C, the first input shaft 1 and the second input shaft 7 are coupled through the shaft clutch means 9 so that the first input shaft 1 is rotated integrally together with the second input shaft 7.

Figure 2D:
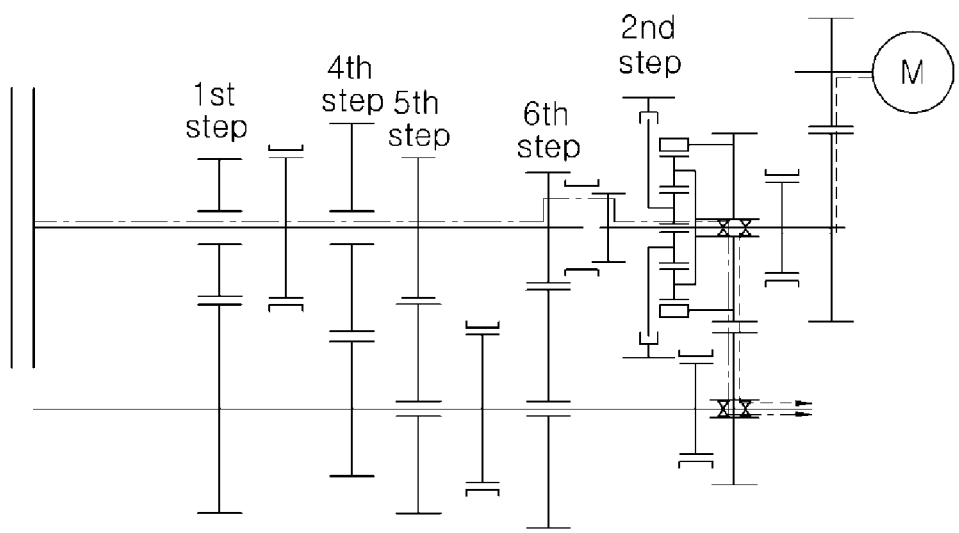
FIG. 2D is a view illustrating procedures of shifting to 2nd step from 1st step in the exemplary hybrid power train as shown in FIG. 1.

When the engine clutch 29 is coupled as in the state as shown in FIG. 2D under the above situation, the motor side driving gear 11 and the motor side driven gear 13 implement 2nd step with the rotational force provided by the engine and the motor to drive the output shaft 3. Subsequently, when the motor is stopped as in the state as shown in FIG. 2E, 2nd step is implemented by only the engine.

That is, the torque is transferred continuously to the output shaft 3 from the motor even when the engine clutch 29 is released while shifting to 2nd step from 1st step and thus the power from the engine is not transferred to the output shaft 3, thereby preventing the torque interruption and improving the shift feeling. Additionally, 2nd step can be implemented by only the engine, only the motor or both such that 2nd step is implemented properly in accordance with a driving state of a vehicle, thereby improving a fuel ratio with a proper driving of a vehicle.

Figure 2E:
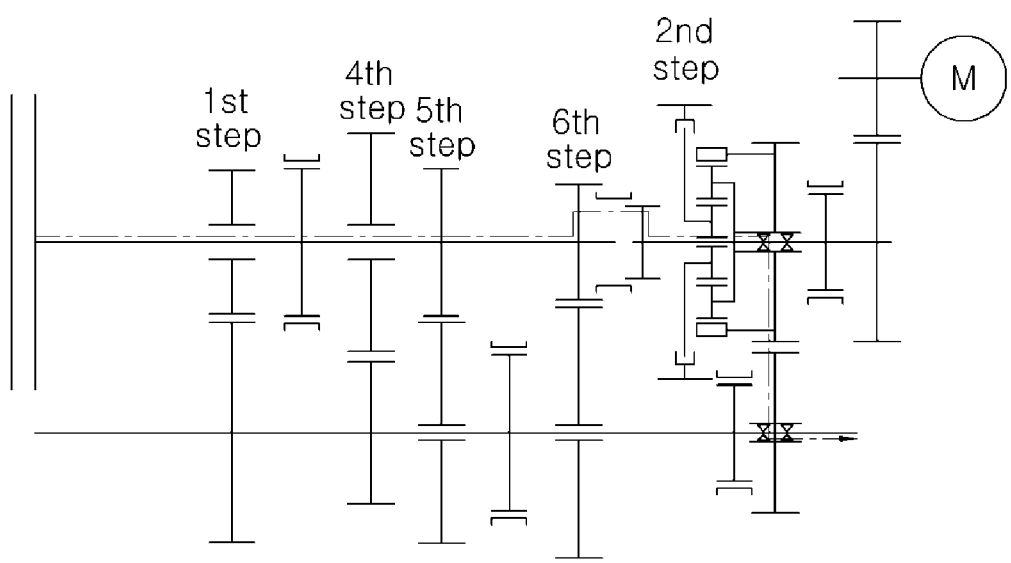
FIG. 2E is a view illustrating procedures of shifting to 2nd step from 1st step in the exemplary hybrid power train as shown in FIG. 1.
Figure 3A:
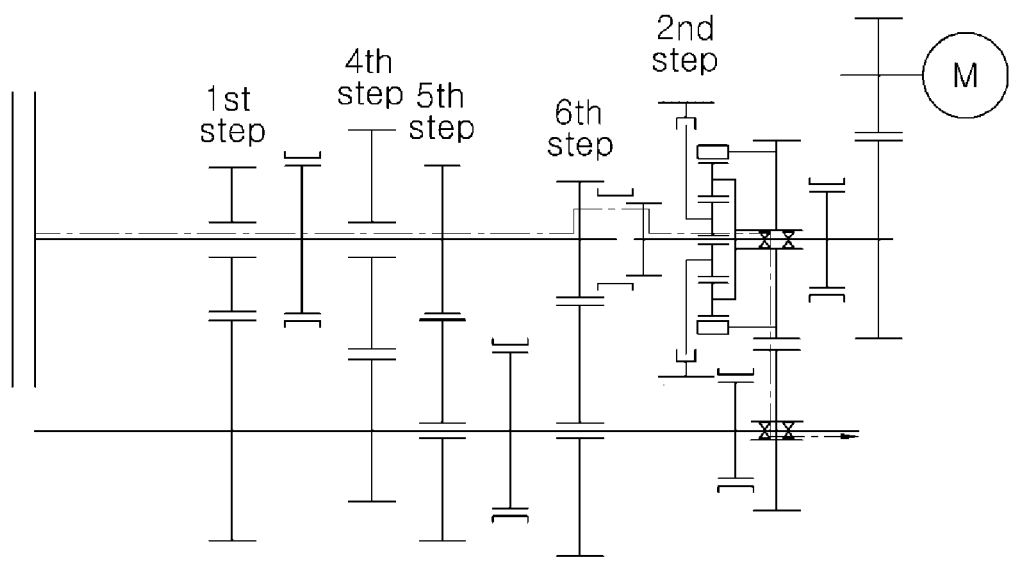
FIGS. 3A and 3B are views illustrating procedures of shifting to 3rd step from 2nd step in the exemplary hybrid power train as shown in FIG. 1.
Figure 3B:
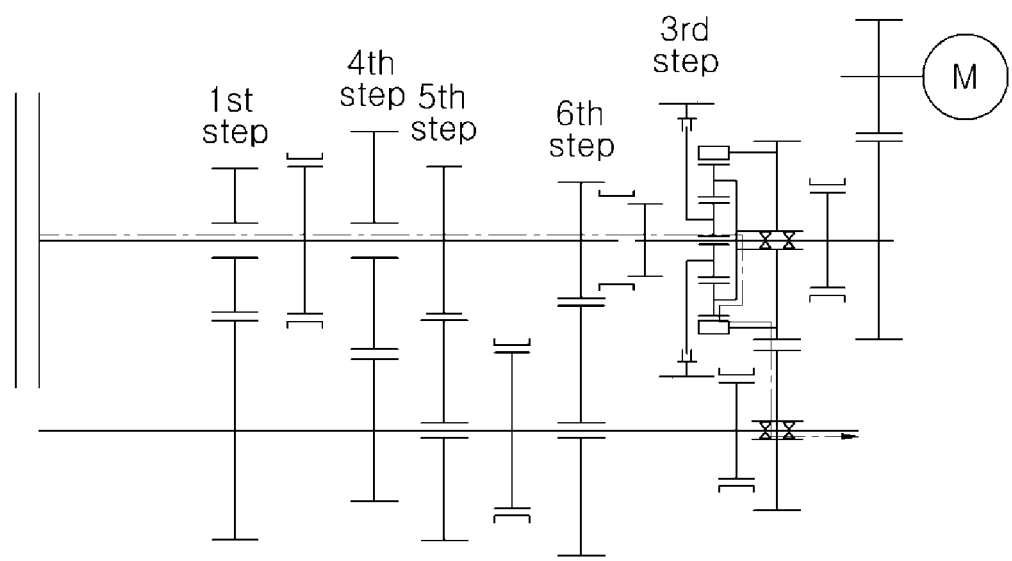

FIGS. 3A and 3B are views showing the procedures of shifting to 3rd step from 2nd step in which FIG. 3A is the same as FIG. 2E wherein a vehicle is driven in 2nd step by only an engine. That is, the power from an engine is transferred to the motor side driving gear 11 through the first input shaft 1, the shaft clutch means 9, the second input shaft 7, and the first one way clutch 25 and subsequently to the motor side driven gear 13 and the second one way clutch 27 thereby to implement 2nd step. At this time, the brake 23 is released so that the carrier C is rotated regardless of the rotations of the ring gear R and the motor side driving gear 11.

Here, when the brake 23 is coupled to fix the sun gear S under the above situation, the rotational force of the carrier C connected integrally to the second input shaft 7 is accelerated to be transferred to the motor side driving gear 11 through the ring gear R thereby to implement 3rd step like 3B.

That is, the shifting to 3rd step from 2nd step is completed by only coupling the brake 23 and of course the torque decrease does not occur during the shifting. At this time, the one way clutch 25 allows the motor side driving gear 11 to be rotated faster than the second input shaft 7.

Figure 4A:
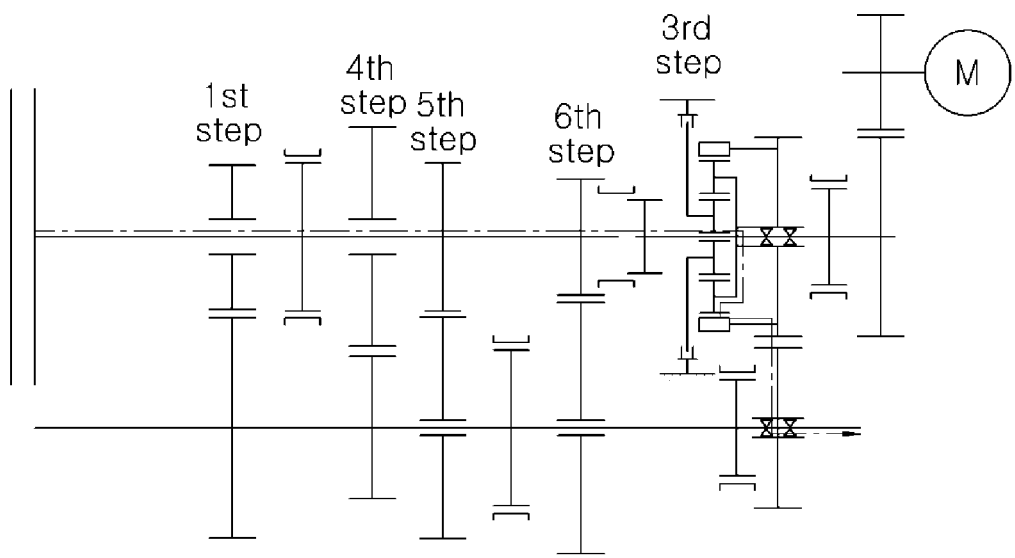
FIG. 4A is a view illustrating procedures of shifting to 4th step from 3rd step in the exemplary hybrid power train as shown in FIG. 1.
Figure 4B:
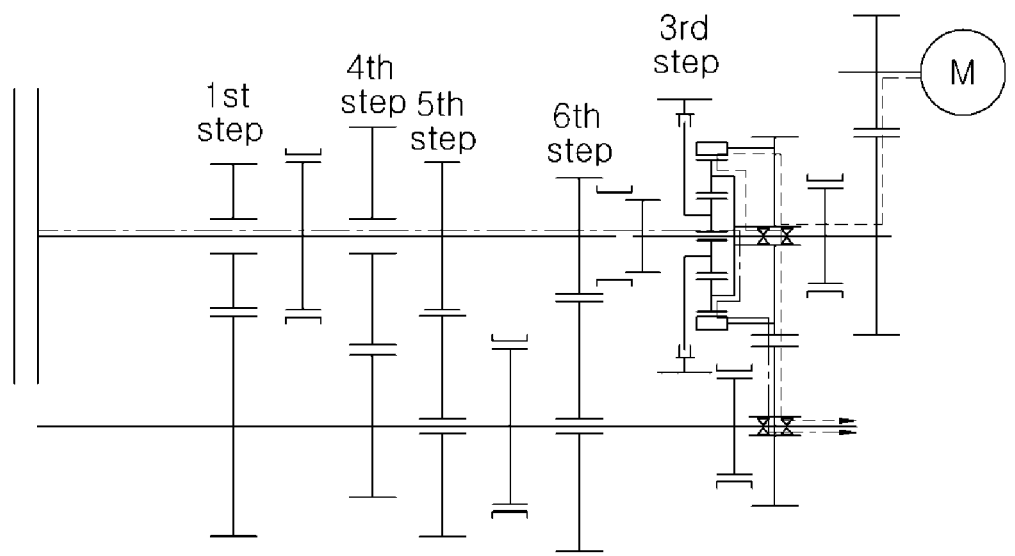
FIG. 4B is a view illustrating procedures of shifting to 4th step from 3rd step in the exemplary hybrid power train as shown in FIG. 1.

FIGS. 4A-4E are views showing the procedures of shifting to 4th step from 3rd step wherein the state of FIG. 4A is the same as the state of FIG. 3B. The motor is controlled to correspond to the current speed of the output shaft 3 and the output shaft 3 is driven simultaneously by the engine and the motor, as shown in FIG. 4B.

Figure 4C:
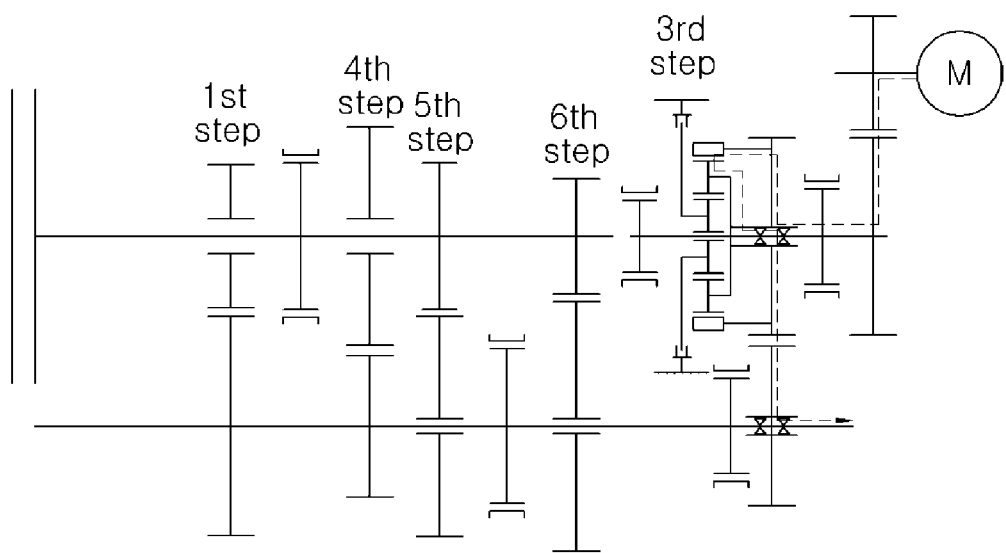
FIG. 4C is a view illustrating procedures of shifting to 4th step from 3rd step in the exemplary hybrid power train as shown in FIG. 1.

Subsequently, the engine clutch 29 is released and also the shaft clutch means 9 is released such that the output shaft 3 is kept in a driving state of a third speed by the motor and the first input shaft 1 becomes a free rotation state, as shown in FIG. 4C.

Figure 4D:
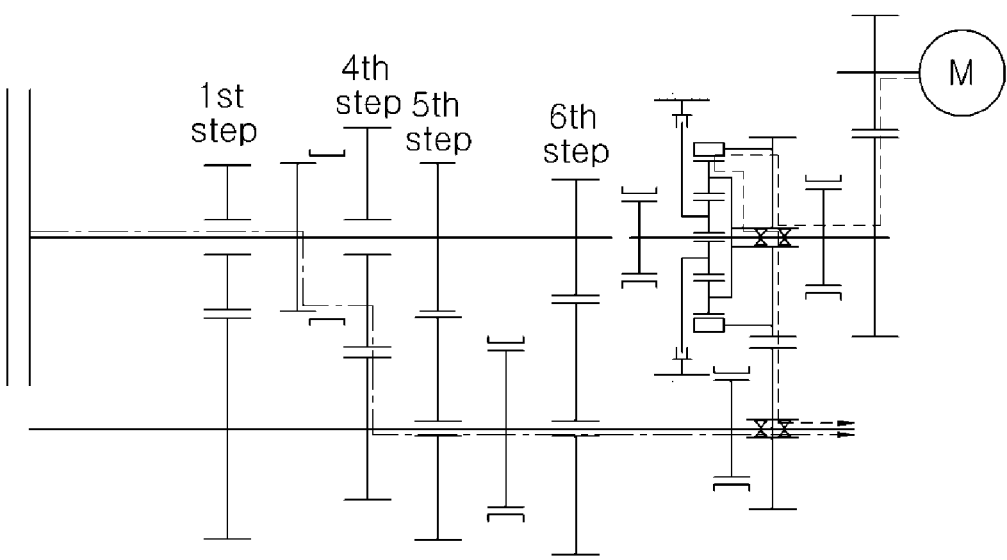
FIG. 4D is a view illustrating procedures of shifting to 4th step from 3rd step in the exemplary hybrid power train as shown in FIG. 1.

Under the above state the shift gear of 4th step is coupled to the first input shaft 1 using the 1 & 4th steps synchro-device 31 and the engine clutch 29 is coupled to be shifted to 4th step as shown in FIG. 4D. At this time the motor is controlled to follow the variation of the rotational speed of the output shaft 3, and even when the rotational speed of the motor is relatively low, the speed difference between the motor and the output shaft is resolved by the second one way clutch 27.

Figure 4E:
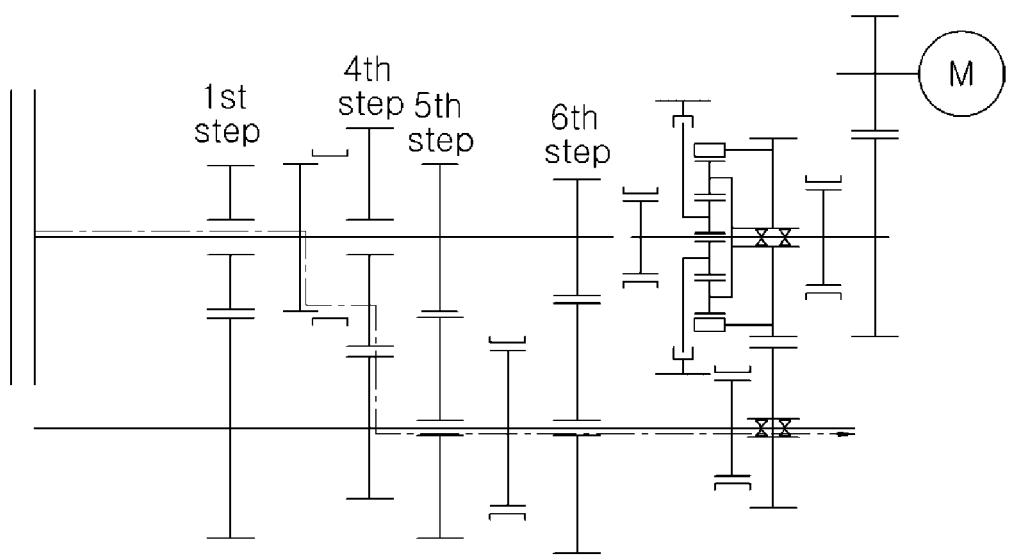
FIG. 4E is a view illustrating procedures of shifting to 4th step from 3rd step in the exemplary hybrid power train as shown in FIG. 1.

Subsequently, when the motor is stopped as in FIG. 4E, the shifting to 4th step, where a vehicle is driven by only the engine, is completed. At this time the power from the engine is not transferred to the motor side driven gear 13 by the second one way clutch 27 and thus the power from the engine is not consumed to rotate the motor and the components connected thereto, thereby improving a fuel ratio of a vehicle.

Subsequently, the same procedures are applied to the shifting of 4th step to 6 step wherein the torque is controlled to be provided continuously to the output shaft 3 by the motor, and in this case, the brake 23 may be coupled possibly to control the rotation number of the motor to be relatively low.

Figure 5:
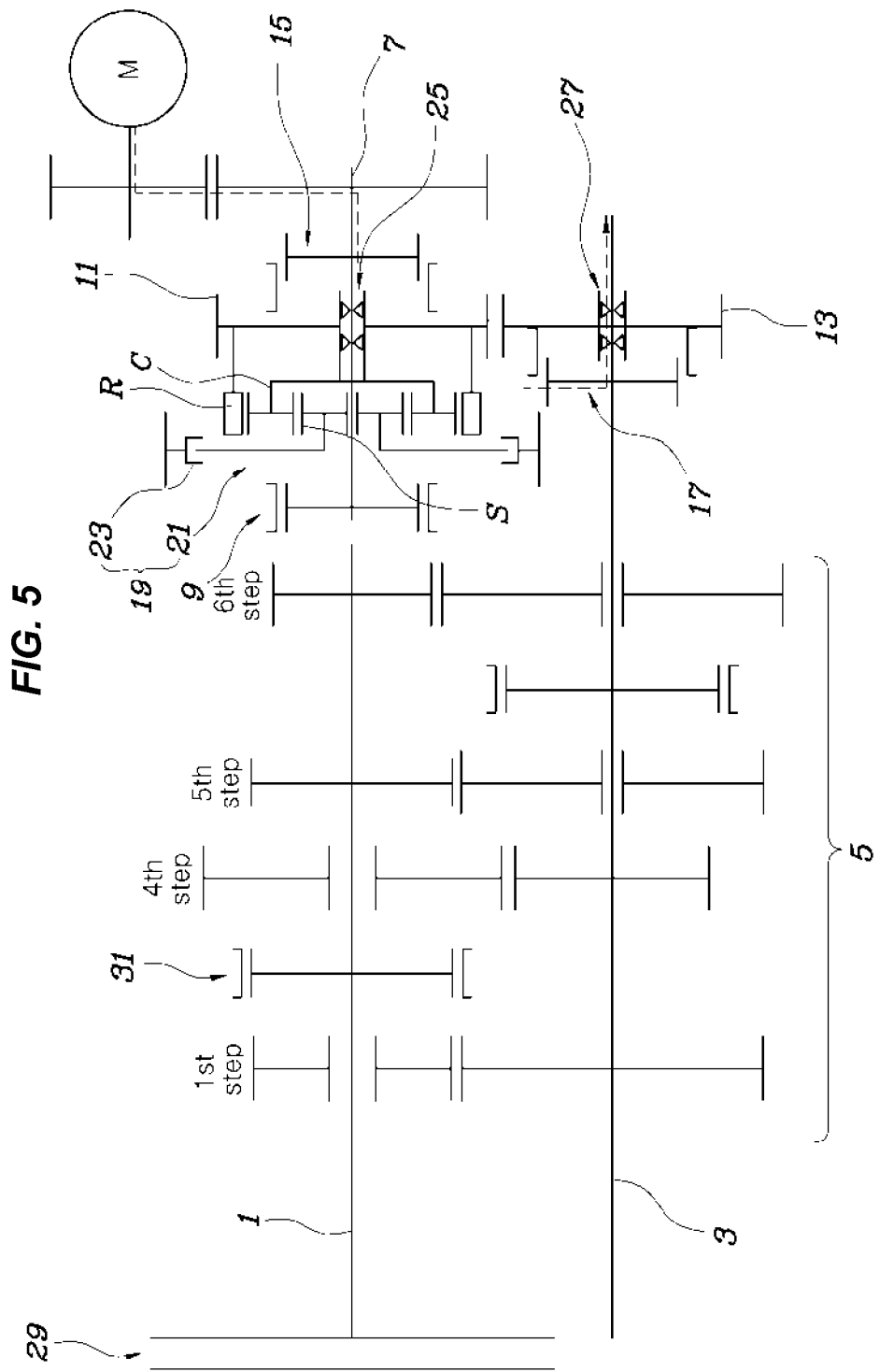
FIG. 5 is a view illustrating procedures of implementing a reverse step in the exemplary hybrid power train as shown in FIG. 1.

FIG. 5 is a view showing the procedures of implementing a reverse step by the power train of the present invention wherein the motor side driving gear 11 is coupled to the second input shaft 7 through the first clutch means 15 and the motor side driven gear 13 is coupled to the output shaft 3 through the second clutch means 17 so that the rotational force generated by reverse-driving the motor is transferred to the output shaft 3 through the motor side driving gear 11 and the motor side driven gear 13 thereby to implement the reverse step.

As described above, according to the present invention, the variable gear ratio providing means 19 for providing the power from the motor can implement a series of effective gear ratios having proper step ratios together with the shift module 5, and thus the degree of freedom for implementing step ratios to be further narrowed in a range of a whole shift step to be implemented can be ensured while configuring a compact power train. Additionally, the torque interruption feeling during a shifting of gears can be prevented, excellent shift quality can be provided, and a fuel ratio of a vehicle can be improved by not consuming the power from an engine when driving the motor and the related components on an engine mode.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hybrid power train for a vehicle comprising:
   a shift module provided with a plurality of shift steps of a synchro-mesh type on a first input shaft and an output shaft that are arranged in parallel to each other;
   a second input shaft that is driven by a motor and arranged coaxially with the first input shaft;
   a shaft clutch means provided for coupling or decoupling the second input shaft and the first input shaft;
   a motor side driving gear that is arranged rotatably on the second input shaft;
   a motor side driven gear that is arranged rotatably on the output shaft to be meshed with the motor side driving gear;
   a first clutch means provided for coupling or decoupling the motor side driving gear to or from the second input shaft;
   a second clutch means provided for coupling or decoupling the motor side driven gear to or from the output shaft; and
   a variable gear ratio providing means provided on the second input shaft to alternatively transfer a rotational force of the second input shaft to the output shaft with two gear ratios different from the shift module through the motor side driving gear and the motor side driven gear.

2. The hybrid power train for a vehicle of claim 1, wherein the variable gear ratio providing means implements a series of gear ratios having effective step ratios together with the gear steps implemented by the shift module.

3. The hybrid power train for a vehicle of claim 2, wherein the shift module is provided with the gear steps having gear ratios of at least forward 1st step and 4th step and the variable gear ratio providing means implements the gear ratio of 2nd step and 3rd step.

4. The hybrid power train for a vehicle of claim 1, wherein the shaft clutch means includes a synchro-mesh device wherein a hub is arranged on the second input shaft.

5. The hybrid power train for a vehicle of claim 1, wherein the variable gear ratio providing means comprises:
   a planetary gear device that is arranged coaxially on the second input shaft, and has three rotational elements, wherein one rotational element is coupled directly to the second input shaft, another rotational element is coupled directly to the motor side driving gear, and the third rotational element is to be able to be restricted from its rotation; and
   a brake for controlling a restricting state of the third rotational element of the planetary gear device.

6. The hybrid power train for a vehicle of claim 5, wherein a first one way clutch is provided between the motor side driving gear and the second input shaft to transfer power only in one direction from the second input shaft to the motor side driving gear, and a second one way clutch is provided between the output shaft and the motor side driven gear to transfer power only in one direction from the motor side driven gear to the output shaft.

7. The hybrid power train for a vehicle of claim 5, wherein the three rotational elements of the planetary gear device are a sun gear, a carrier, and a ring gear, wherein the carrier is coupled directly to the second input shaft, the ring gear is coupled directly to the motor side driving gear, and the sun gear is arranged for its rotation to be restricted by the brake.

8. The hybrid power train for a vehicle of claim 1, wherein the first clutch means and the second clutch means include dog clutches, respectively.

9. The hybrid power train for a vehicle of claim 1, wherein the first clutch means and the second clutch means include a dog clutch or a synchro-device of a synchro-mesh type, respectively.

* * * * *